United States Patent
Guthery et al.

(10) Patent No.: US 6,676,022 B1
(45) Date of Patent: Jan. 13, 2004

(54) SMART CARD SYSTEM WITH COMMAND QUEUING

(75) Inventors: Scott B. Guthery, Newton, MA (US); Perry J. Spero, Melrose, MA (US)

(73) Assignee: Mobile-Mind, Inc., Watertown, MA (US)

( * ) Notice: Subject to any disclaimer, the term of this patent is extended or adjusted under 35 U.S.C. 154(b) by 0 days.

(21) Appl. No.: 10/265,353

(22) Filed: Oct. 4, 2002

(51) Int. Cl.[7] ............................................. G06K 19/06
(52) U.S. Cl. ........................ 235/492; 235/380; 235/487; 710/244; 712/204
(58) Field of Search ............................. 235/492, 487, 235/380, 375, 382; 707/1; 710/244; 712/32, 204, 214; 902/4

(56) References Cited

U.S. PATENT DOCUMENTS

| | | | | |
|---|---|---|---|---|
| 4,748,320 A | * | 5/1988 | Yorimoto et al. ............ | 235/492 |
| 5,408,082 A | * | 4/1995 | Takagi et al. ................ | 235/492 |
| 5,506,397 A | * | 4/1996 | Hoshino ...................... | 235/492 |
| 5,517,014 A | * | 5/1996 | Iijima .......................... | 235/492 |
| 5,635,703 A | * | 6/1997 | Tanaka ........................ | 235/492 |
| 5,898,165 A | * | 4/1999 | Kinugasa et al. ............ | 235/492 |
| 5,992,738 A | * | 11/1999 | Matsumoto et al. ......... | 235/381 |
| 6,092,133 A | * | 7/2000 | Erola et al. .................. | 710/301 |
| 6,247,084 B1 | * | 6/2001 | Apostol et al. ............. | 710/108 |
| 6,354,489 B2 | * | 3/2002 | Tanaka ........................ | 235/375 |
| 6,452,693 B1 | * | 9/2002 | Isoda et al. ................. | 358/1.16 |

* cited by examiner

*Primary Examiner*—Karl D. Frech
*Assistant Examiner*—Edwyn Labaze
(74) *Attorney, Agent, or Firm*—Lucash, Gesmer & Updegrove, LLP (57) ABSTRACT

A smart card-based information processing system capable of compatibly operating under a standard requiring the complete processing of one command at a time, but which is also capable of queuing commands received from applications external to the smart card that it cannot immediately process. When the smart card receives a command that it can process immediately, it processes the command and returns an appropriate status response word. When the smart card receives a command that it cannot process immediately, it places the command in a command queue and returns a status response word indicating that it cannot immediately process the command, along with an index/identifier defining the memory location of the queued command in the command queue. If the smart card also has data or other information developed as a result of executing a previously queued command, it transmits an appropriate proactive command to the application, so that the application can send a command to request the information.

19 Claims, 4 Drawing Sheets

SMART CARD SYSTEM WITH COMMAND QUEUING

BACKGROUND OF THE INVENTION

1. Field of the Invention

The present invention relates to integrated circuit card ("smart card")-based systems and methods, and more particularly, to smart card-based systems having a command queuing functionality for queuing command(s) received from application(s) external to the smart card that cannot be immediately processed for delayed processing or execution of such queued commands. The present invention has utility in mobile telephone communication systems, wide area networked computer communication systems, point-of-sale terminals and other integrated circuit card applications.

2. Background

In general, smart cards are integrated circuit cards that form a part of a circuit or system when engaged with a smart card interface device such as a card reader, an automated teller machine, a vending machine, or a mobile telephone handset. The complexity of smart cards varies from being little more than a device allowing the storage and retrieval of information, to those having microprocessors and substantial memory. Their uses are numerous, including for example, communication devices such as mobile telephones, computer security devices, and financial transaction cards for use in automated teller machines and the like.

The prior art includes a number of patents and other references generally related to information processing and integrated circuit cards and to the queuing of commands in multi-tasking operating systems. These include the following, the teachings and disclosure of which can be referenced as background to the invention described herein:

- U.S. Pat. No. 6,212,576: Operating System Interface for use with Multi-tasking GSM Protocol Stacks;
- U.S. Pat. No. 6,009,454: Multi-tasking Operation System for Industrial Controller;
- U.S. Pat. No. 4,847,751: Multi-task Execution Control System;
- U.S. Pat. No. 4,652,990: Protected Software Access Control Apparatus and Method;
- WO019,9448 A1: Method for Processing and Transmitting Data on a Mobile Telephone Network and Microchip Onboard System;
- WO015,2575 A1: Representation of Applications in a Telecommunication System;
- WO014,3472 A1: Safe Information Interchange between a user of a Terminal and a SIM Application Toolkit via WAP.

The computational resources of almost all commercial smart cards—computing power, storage capacity and communication bandwidth—are greatly limited. A typical commercial smart card has a ½ million instruction per second (MIP) processor, 1 kilobyte of random access memory (RAM) and can communicate at 9600 bits per second. This situation has lead to smart card standards and usage protocols that require that each command sent to a smart card be completely executed and processed before the smart card is able to receive another command. In the situation in which a smart card was used for a single purpose and served only one application, this was not an unduly onerous constraint because only this application had to wait for its commands to be processed and the card devoted all of its modest resources to the processing of the commands from this single application.

In the ever-more-frequent situation where a smart card is used simultaneously for multiple purposes—for example, in a mobile phone, to authorize access to a mobile network, to pay for received multi-media entertainment, to provide digital rights management for this media and even perhaps to accumulate loyalty points for consuming the entertainment—the "single-threaded" behavior of the smart card may represent a system bottleneck, where several different applications must wait in line to have each of their commands completely processed before the smart card can consider other commands from the same application, or any commands from another application.

This bottleneck may cause inconvenience beyond simply slowing down the overall transaction time in using the smart card. In the above noted situation, for example, the relatively simple network access application may have to wait for the comparatively complex procedure of the payment application to complete before it is able to re-authenticate the subscriber to the network. If the payment application takes too long and the re-authentication is not performed within rigid time parameters, the network may drop the connection to the mobile device.

Another pitfall of conventional smart card systems may occur when logical channels are employed. Logical channels allow applications to establish independent communication contexts with the smart card, while not violating the single command consideration limitation. For example, the smart card may use different cryptographic keys to encrypt the communication on each of the logical channels so that on other logical channels or any intermediate nodes cannot interpret communication between the smart card and the application on a particular logical channel. However, this approach, too, can be problematic when commands from independent applications executed on the different logical channels need to access the same file of the smart card, since the changing of a file's contents may affect subsequent commands accessing the same file. In such a case, the combined suite of applications must be designed to carefully avoid such conflicts to avoid inconsistent results and command processing errors. Such coordinated behavior is virtually impossible to achieve because these applications are provided by wholly independent entities—a network operator, a financial institution, a media company and an airline in the above example—and furthermore these smart card-accessing applications are not typically in communication with one another, What is required, but unavailable in the prior art, is a smart card-based information processing system and method that allows for the concurrent consideration and processing of more than one command without the concomitant prior art processing errors and inconsistent data problems, and the contemporaneous processing and consideration of commands from more than one application, all the while giving the virtual effect of being compliant with a standard or protocol requiring the consideration of only one command at a time.

SUMMARY OF THE INVENTION

To overcome the noted deficiencies of the prior art, the present invention provides a method of processing commands in a smart card in an environment governed by a standard requiring that a smart card completely process a received command before accepting another command. In one practice of the invention, the method includes the steps of (1) receiving commands from at least one application external to the smart card; (2) processing a received command when it is received if it is capable of being immediately processed, and returning command processing response indicia to the application from which the command emanated; (3) placing a received command in a queue when it is not capable of being immediately processed, and returning command processing response indicia to the application from which the command emanated, the indicia comprising queue location information for each queued command; and (4) processing queued commands when the smart card is capable, and returning command processing response indicia to the source application from which the command emanated. The smart card, in turn, is adapted to receive and process a command while a previously received command is queued and unprocessed.

Another aspect of the present invention is a smart card-based information processing system. In one embodiment, the system includes (1) a smart card adapted to receive and process commands from one or more external applications, (2) a smart card interface device coupled to the smart card, and (3) at least one external application adapted to generate and transmit commands related to one or more application tasks to the smart card interface device. The smart card interface device is adapted to transmit commands and information between each external application and the smart card. The system is capable of executing command processing in an environment governed by a standard requiring that a smart card completely process a received command before accepting another command. The smart card itself is adapted to (1) process a received command when it is received if it is capable of being processed, and return command processing response indicia to the source application from which the command emanated; and (2) place a received command in a queue when it is not capable of being immediately processed, and return command processing response indicia to the source application from which the command emanated, the indicia comprising queue location information. The smart card is also adapted to (3) process queued commands when the smart card is capable, and return command processing response indicia to the application source from which the command emanated; and (4) receive and process a command while a previously received command is queued and unprocessed.

BRIEF DESCRIPTION OF THE DRAWINGS

A more complete understanding of the present invention and the attendant features and advantages thereof may be had by reference to the following detailed description of the invention when considered in conjunction with the accompanying drawings wherein.

DETAILED DESCRIPTION OF THE INVENTION

Figure 1:
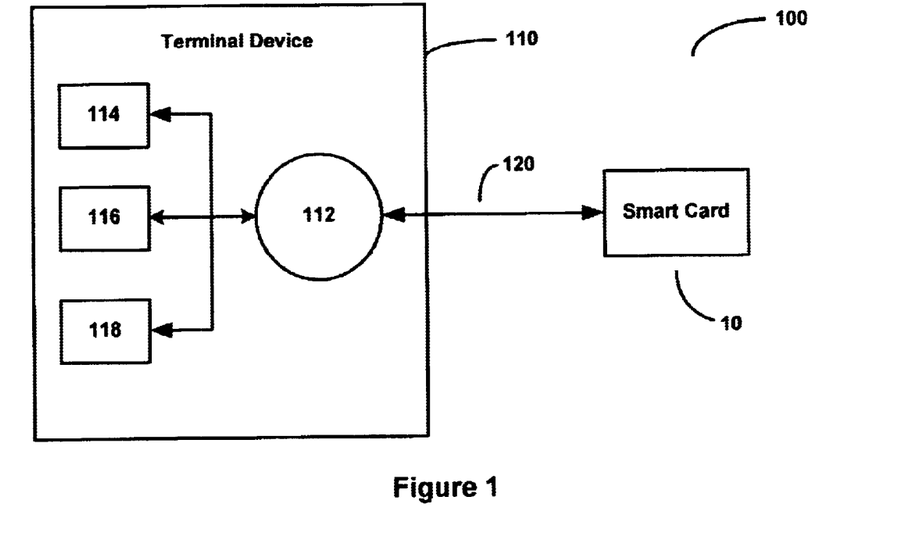
FIG. 1 is a block diagram of a smart card-based information processing system incorporating command queuing according to the present invention.
Figure 2:
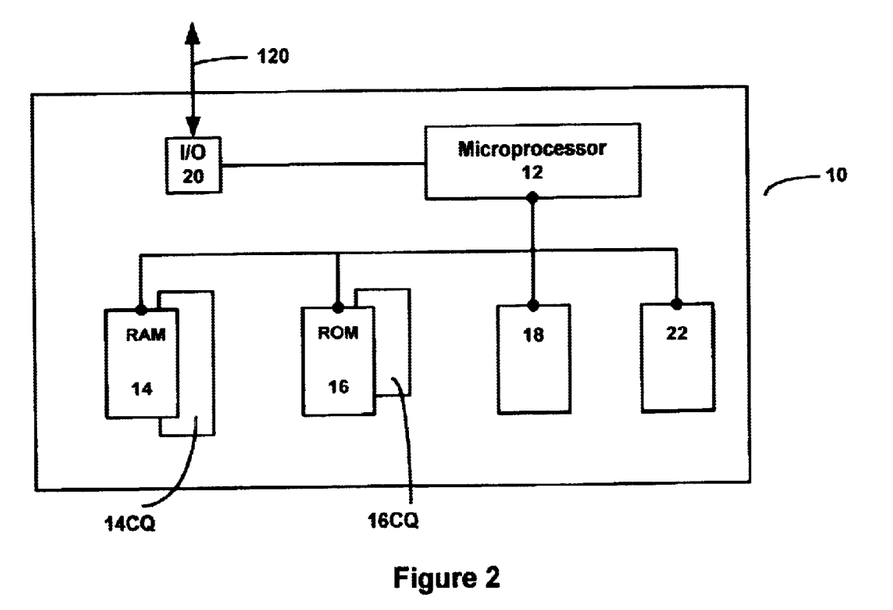
FIG. 2 illustrates an exemplarily embodiment of a smart card with command queuing for use in the smart card-based information processing system of FIG. 1.

Referring now to the drawings wherein like reference numerals identify corresponding or similar elements throughout the several views, FIGS. 1–2 illustrate an embodiment of a smart card information processing system 100 including a smart card 10 that incorporates command queuing according to the present invention, which enables the smart card 10 to delay the execution of commands that cannot be immediately processed when received, and to place such commands in a command queue for later execution. As a result, the smart card 10 can process newly received commands while others are in the command queue, but in a manner having virtual consistency with a single command processing protocol.

The described embodiment of the smart card information processing system 100 according to the present invention, as illustrated in FIG. 1, includes a smart card 10 and a terminal device 110 such as a card reader, a point-of-sale terminal, an automated teller machine, a vending machine, or a mobile telephone handset. The terminal device 110 includes an interface mechanism 112 such as a microprocessor or operating system that is operative to transmit and receive messages from the smart card 10 and a plurality of applications 114, 116, 118 engaged in concurrent "transactions" (defined below), i.e., multi-tasking, with the smart card 10 via the interface mechanism 112 and a communication channel 120. While multi-tasking is described herein in terms of multiple applications 114, 116, 118 stored on the terminal devise 110, one skilled in the art will appreciate that the present invention is not limited to the described embodiment, e.g., remote applications can be in a multi-tasking relationship with the smart card information processing system 100. While preferred embodiments of the present invention are described herein in terms of a smart card, one skilled in the art will appreciate that a smart card is but one specific embodiment of an integrated circuit card, and, accordingly, that the present invention has utility for integrated circuit cards in general.

An exemplary embodiment of a smart card 10 for the smart card processing system 100 of FIG. 1 is illustrated in FIG. 2 and comprises a microprocessor 12, a RAM 14, a ROM 16, a non-volatile memory 18, an I/O interface 20, and a SIM Application Toolkit 22. The microprocessor 12 is any suitable central processing unit that is capable of executing commands and controlling the operation of the smart card 10. The RAM 14 provides storage for calculated results and also functions as stack memory for the smart card 10. The ROM 16 stores the smart card operating system, fixed data, and standard instructions implemented by the smart card 10. The non-volatile memory 18, e.g., flash memory (flash RAM) or FRAM (ferroelectric RAM). provides storage for information that must not be lost when the smart card 10 is disconnected from the terminal devise 110, i.e., powered down, and also allows the alteration of some or all of such information and/or the addition of new information under specified conditions. The I/O interface 20 provides the interconnection mechanism (see arrow 120) between the smart card 10 and the terminal device 110 for communication therebetween, e.g., physical contacts, radiant energy. The SIM Application Toolkit 22 provides mechanisms that allow applications existing in the smart card 10 to interact and operate with the terminal device 110.

Historically, the interaction between the smart card 10 and the terminal device 110 was a master-slave relationship. In this master-slave relationship, the terminal devise 110, as the master, initiated each transaction with the smart card 10 by transmitting a standardized APDU (Application Protocol Data Unit) command using a standardized protocol, e.g., the T=0 protocol, to which the smart card 10 provided an associated response from a standardized set of responses (see, e.g., Table I below) to terminate the transaction. Each such command/response pair is defined as a "transaction". A sequence of command/response pairs, i.e., transactions, is used to perform all or part of an application-oriented task. As noted above in the Background section, in the current art each transaction or command/response pair must be completed before the terminal device 110 can initiate the next transaction, i.e., command.

The smart card 10 may or may not return processing data in response to a command, but according to the international smart card standards must always return a two-byte status response word that indicates the status of processing within the smart card 10, including the status of the command most recently received. To facilitate a better understanding of the present invention, the operation of the smart card 10 of the smart card information processing system 100 according to the present invention is described herein in terms of the relevant commands and status response words defined in the ISO 7816-4 and ETSI TS 102 221 standards. Such description is not intended to limit the scope of the present invention, and one skilled in the art will appreciate that the features of the present invention described herein can be utilized with other standards or even in circumstances where standards are not employed (e.g., commands and/or status words are proprietary).

In response to a command initiated by the terminal devise 110, the smart card 10 of the smart card information processing system 100 can return the two-byte status response word depicted in Table I (as defined in the smart card standards referenced above) if the command received from the terminal device 110 has been successfully processed (the "0x" indicates that the status response word is expressed as a hexadecimal number).

TABLE I

| Two-Byte Status Response Word | Definition |
|---|---|
| 0 × 9000 | Command successfully processed |

In the circumstance that the smart card 10 cannot or does not successfully execute a command, the smart card 10 returns a status response word indicating that command processing was not successful, i.e., an 'error' status response word (even if the error was only transient). Responding with an error status response word is based upon the requirement that a transaction be completed before another transaction is initiated by the terminal device 110. That is, the error status response word provides the response required to complete the transaction, thereby enabling the terminal device 110 to initiate another transaction, i.e., command. Representative examples of such error status response words, as defined in the above-disclosed smart card standards, are presented in Table II.

TABLE II

| Two-Byte Status Response Word | Definition |
|---|---|
| 0 × 6282 | End of file reached during read |
| 0 × 6283 | Selected file invalidated |

TABLE II-continued

| Two-Byte Status Response Word | Definition |
|---|---|
| 0 × 6982 | Security condition not satisfied |
| 0 × 6A82 | File not found |

Until the advent of the SIM Application Toolkit 22, there was no mechanism for the smart card 10 to request that the terminal device 110 initiate a transaction. Utilizing the SIM Application Toolkit 22, the smart card 10 can be "proactive", i.e., capable of transmitting a proactive command to the terminal device 110 to initiate a transaction. Under the ETSI TS 101 223 standard, the proactive smart card 10 initiates the transmission of a proactive command by transmitting a status word with the format 0x91XX when it would have transmitted 0x9000 were it not a proactive smart card. This response mechanism allows the proactive smart card 10 to request that the terminal device 110 initiate a transaction while operating within the constraints imposed by the T=0 protocol. Of particular interest for purposes of the present discussion is the status response word set forth in Table III.

TABLE III

| Proactive Status Response Word (SW1)(SW2) | Definition |
|---|---|
| 0 × 91XX | Command processed successfully, and there are XX bytes of data to be transferred |

In response to the proactive status response word "0x91XX" the terminal device 110 initiates a FETCH command to retrieve the XX bytes of proactive command data from the smart card 10 (where XX is an integer defining the number of bytes of data to be retrieved).

As noted above, a smart card information processing system must complete a transaction, i.e., a command/response pair, before the next transaction can be initiated. This constraint, which is inherent in existing smart card information processing systems, engenders problems when the smart card of the smart card information processing system is subject to multi-tasking, i.e., multiple commands are being directed to the smart card by independent terminal and/or network applications. In such a multi-tasking environment, the smart card is constrained to return an error status response word with respect to all commands that cannot be executed because the smart card is currently in the process of executing one particular command. Since the independent applications effecting multi-tasking only know that their own transactions have not been completed (the internal processing state of the smart card is hidden from external applications), unexecuted commands must be re-initiated at a later time to complete the transactions that comprise the multi-tasking environment. This circumstance is a non-productive expenditure of the limited resources, e.g., low bandwidth, of existing smart card information processing systems.

Accordingly, the smart card 10 of the smart card information processing system 100 according to the present invention is designed to incorporate a new status response word, i.e., the CQ status response word, and the functionality associated therewith. These new features of the smart card 10 of the smart card information processing system 100 according to the present invention facilitates multi-application resource sharing, command interleaving, and command queuing within the smart card 10 and within the standard operating procedures of the smart card 10. The new CQ status response word according of the present invention is illustrated in Table IV. Those skilled in the art will understand that another status response word of similar construction; 0x94YY for example, could also be used in the practice of the present invention.

TABLE IV

| Two-Byte CQ Status Response Word | Definition |
| --- | --- |
| 0 × 92YY | Command Queued with an assigned index or identifier "YY" in the smart card command queue. |

Figure 3:
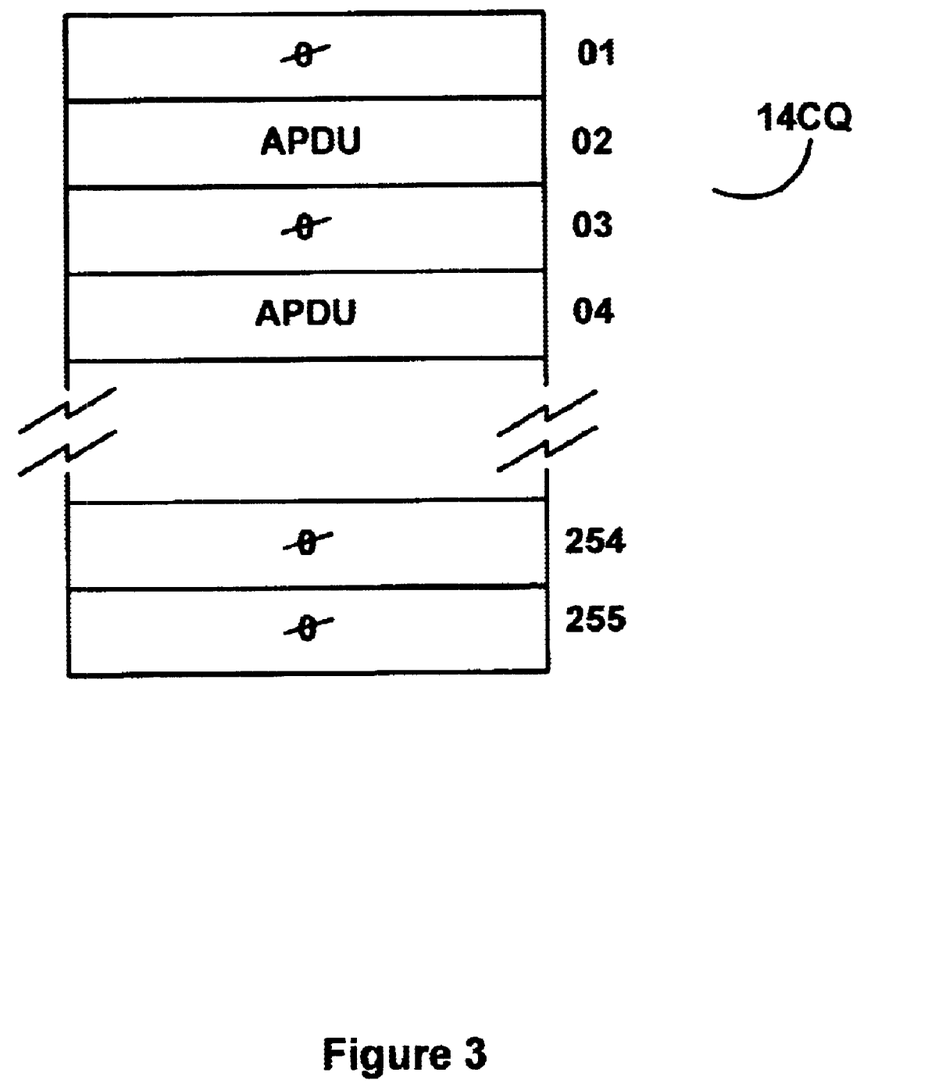
FIG. 3 illustrates an exemplary embodiment of a command queue of the smart card of FIG. 2.

To store unexecuted commands in the smart card 10, the RAM 14 of the smart card 10 is partitioned to include a memory space that functions as a command queue 14CQ. An exemplary embodiment of such a command queue 14CQ is illustrated in FIG. 3. The illustrated embodiment of the command queue 14CQ comprises two hundred fifty-five (255) slots identified by indexes/identifiers from 01 to 255 where these indexes/identifiers define the memory location "YY" where the associated command is stored. Each slot contains either: (1) a queued command, i.e., APDU; or (2) a zero. In the embodiment illustrated, commands (APDUs) are stored (queued) in indexes 02 and 04 and the remaining indexes of the command queue 14CQ have a zero stored therein.

The ROM 16 of the smart card 10 is augmented and revised to include a new set of instructions 16CQ to implement the command queuing function provided by the smart card 10. This command queuing instruction set 16CQ allows the smart card 10 according to the present invention to implement the following functions: (1) store unexecuted commands in the command queue 14CQ of the smart card 10; (2) transmit the CQ status response word "0x92YY" to the application that initiated the command that was stored in the command queue 14QC; and (3) manage unexecuted (queued) commands stored in the command queue 14CQ.

When an application receives the CQ status word "0x92YY" in response to a command transmitted to the smart card 10, the application recognizes that its command has been received by the smart card 10, but that the smart card 10 has not processed such command. At a later moment in time the application can transmit a STATUS command with a reference to the identifier "YY" to the smart card 10 to ascertain the status of the unexecuted or queued command. The response from the smart card 10 will either be another CQ status response word "0x92YY", indicating that the queued command still has not been processed, or it will be a status response word indicating that the queued command has been successfully executed, e.g., "0x9000" or "0x91XX", or an error status response word indicating that the queued command was not successfully executed.

Management of unexecuted or queued commands includes the functions of: (1) maintaining the status of unexecuted or queued command, e.g., association between each unexecuted or queued command and its source application; (2) monitoring the command currently being processed by the smart card 10; and (3) executing unexecuted or queued commands when appropriate.

Further, the smart card 10 of the smart card information processing system 100 according to the present invention is designed to incorporate a new proactive command, identified as the RESULTS OF QUEUED COMMANDS proactive command, and the functionality associated therewith. These new features of the smart card 10 of the smart card information processing system 100 according to the present invention allow the smart card 10 according to the present invention to consolidate the results from the execution of one or more processed queued commands in one data transfer to the terminal devise 110, thereby advantageously and efficiently utilizing the limited communication channel between the smart card 10 and the terminal device 110. In particular, the proactive RESULTS OF QUEUED COMMANDS command according to the present invention allows the results of one or more processed queued commands to be transmitted to the terminal device 110 such that multi-tasking operations can be conducted concurrently by multiple applications, e.g., applications 114, 116, 118.

The format of this is described herein in the context of the proactive command format prescribed in the ETSI TS 102 223 standard to facilitate the description and better understanding of this facet of the present invention. One skilled in the art will appreciate that such description is not intended to limit the scope of the present invention, and that other formats for the RESULTS OF QUEUED COMMANDS command according to the present invention are within the scope of this invention. The new proactive command according of the present invention is exemplarily illustrated in Table V.

TABLE V

| Byte(s) | Description | Length |
| --- | --- | --- |
| 1 | Proactive UICC Command tag | 1 |
| 2 | Length - number of following bytes | 1 |
| 3–7 | Command Details with type of command set to RESULTS OF QUEUED COMMANDS | 5 |
| 8–11 | Device Identities | 4 |
| 12 | Queue identifier of completed command #1 | 1 |
| 13–14 | Status word of completed command #1 | 2 |
| 15 | Length (l1) of data associated with completed command #1 | 1 |
| 16–(15+l1) | Data associated with execution of completed command #1 | l1 |
| . . . | | |
| n | Queue identifier for completed command #k | 1 |
| n+1–n+2 | Status word of completed command #k | 2 |
| n+3 | Length (lk) of data associated with completed command #k | 1 |
| (n+4)–(n+3+lk) | Data associated with execution of completed command #k | lk |

Of relevance to the present discussion are bytes 3 through 7, and the related series of bytes 12 through 16—(15+l1) or n through n+4—(n+3+lk). Bytes 3 through 7 are identified as the "Command Details" of the proactive command, i.e., a description of the specific characteristics of any particular proactive command. Table 13-4 of the ETSI standard identified above provides the standardized coding currently adopted and allocated values defining Type of Command, i.e., the value of byte 6. For example, a value of "25" in byte 6 is identified in Table 13-4 as the SET UP MENU proactive command. Since the RESULTS OF QUEUED COMMANDS proactive command of the present invention has not as yet been adopted by ETSI, no value has been assigned for this particular proactive command.

Each related series of bytes in the RESULTS OF QUEUED COMMANDS command, e.g. bytes 12 through 16—(15+l1), defines the characteristics of the results of one command processed by the smart card 10 according to the present invention. The first byte, e.g., byte 12 in Table V, identifies the processed queued command in terms of the index/identifier that defines the slot in the command queue 14CQ where the command was placed, e.g., "YY" in the context of the CQ status response word "0x92YY". The second and third bytes, e.g., bytes 13–14 in Table V, define the two-byte status response word associated with the processed command. The fourth byte, e.g., byte 15 in Table V, defines the length of the data associated with the processed command. If no data is associated with the processed command, a zero value is inserted in the forth byte (see examples below). The remainder of the bytes, e.g., bytes 16—(15+l1) in Table V, contain the data resulting from the processed command. Each related series of bytes in the Results of Queued Commands command, e.g., bytes 12 through 16—(15l1) will take on one of several forms. The most common responses are illustrated in Table VI where "YY" is used as a generic index/identifier that defines the slot in the command queue 14CQ where the command was placed and previously reported to the application in the 0x92YY status word.

TABLE VI

| Executed With Data Results | Processing Error | Executed But No Resultant Data |
|---|---|---|
| YY | YY | YY |
| 9000 | 6A83 | 9000 |
| 4 | 0 | 0 |
| datadatadatadata | | |
| datadatadatadata | | |
| datadatadatadata | | |
| datadatadatadata | | |

The first column of Table VI illustrates a queued command that was successfully executed by the smart card 10 and which includes four (4) bytes of resultant data. The second column of Table VI illustrates a queued command that was not successfully executed by the smart card 10; instead, the apposite error status response word is being returned to the command-initiating application by the smart card 10, e.g., 0x6A83. The third column of Table VI illustrates a queued command that was successfully executed by the smart card 10, but there was no data resulting from command processing.

Figure 4:
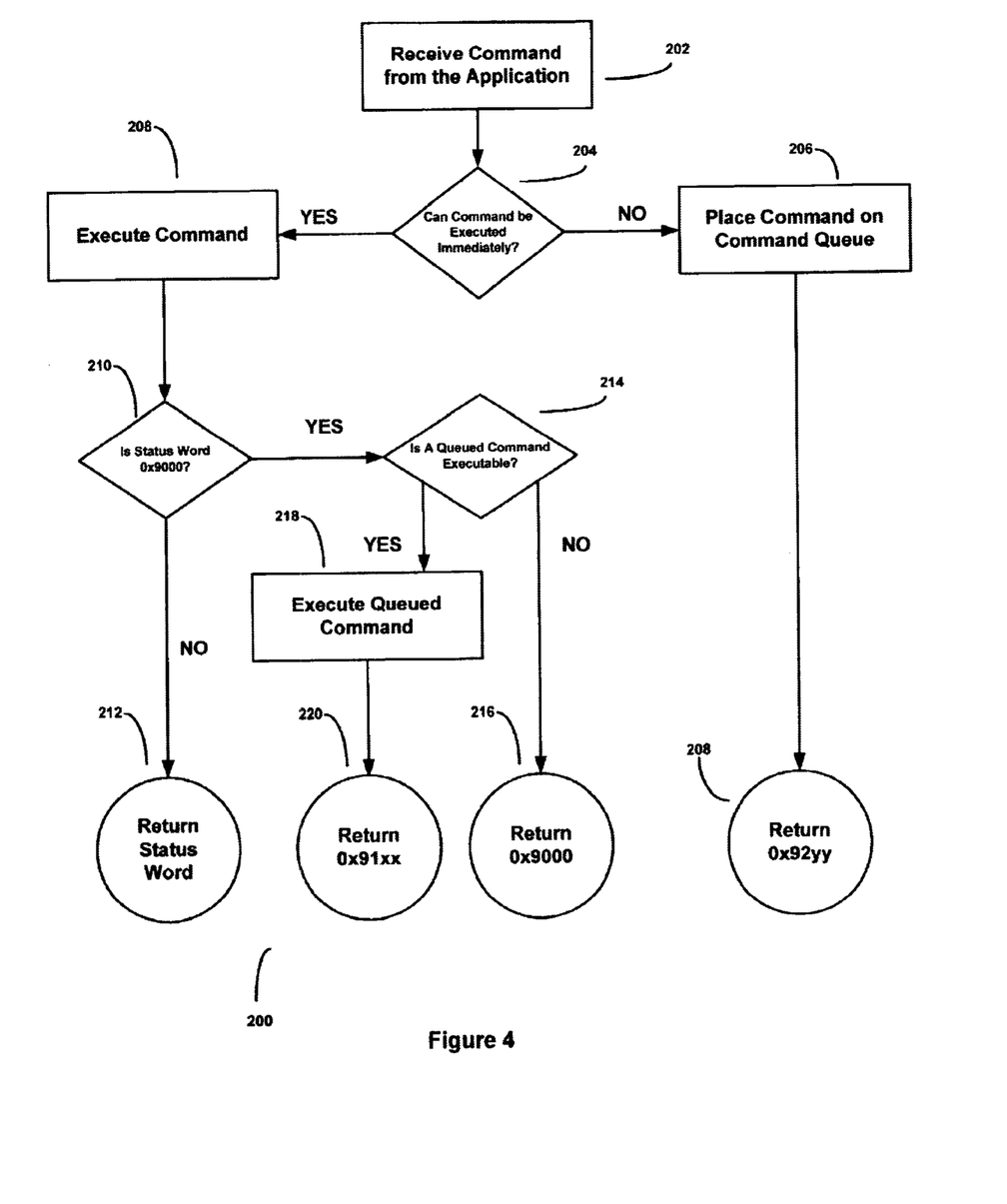
FIG. 4 is a flowchart depicting the instructions executed by the smart card of FIG. 2 for implementing command queuing functionality and/or the proactive command functionality according to the present invention.

FIG. 4 is a flowchart illustrating the method 200 of implementing the command queuing instruction set 16CQ of the smart card 10 according to the present invention. In step 202 the smart card 10 receives a command from an application, e.g., one of applications 114, 116, 118 of the terminal device 110, via the I/O interface 20. In step 204, the microprocessor 12 is operative to determine whether this command can be executed immediately. If the microprocessor 12 is currently processing a command (or is otherwise busy), i.e., the received command cannot be immediately executed, the microprocessor 12 is operative in step 206 to place the command in a slot in the command queue 14CQ identified by index=YY. Next, in step 230 the microprocessor 12 is operative to transmit the status response word "0x92YY" to the initiating application. Receipt of the status response word "0x92YY" indicates to the initiating application that the smart card 10 cannot immediately execute the command due to a transient condition, and that the smart card 10 has stored the command for later execution. Receipt of the status response word "0x92YY" indicates to the initiating application that the smart card 10 cannot immediately execute the command due to a transient condition, and that the smart card 10 has stored the command for later execution.

If in step 204 the microprocessor 12 determines that the command can be immediately executed, the microprocessor 12 is operative in step 208 to immediately execute the command. Next, in step 210 the microprocessor 12 determines whether the command was executed successfully or not. If the command was not successfully executed, the microprocessor 12 is operative to determine which error status response word describes the reason for the lack of success in processing the command, and generates and transmits such error status response word to the initiating application in the manner of the current art in step 212.

If the command was successfully executed, i.e., the status response word is "0x9000, the microprocessor is operative in step 214 to determine if there are any queued commands in the command queue 14CQ that can or should be executed at this time. If not, the microprocessor 12 is operative in step 216 to return the status response word "0x9000" to the terminal device 110.

If, in step 214, the microprocessor 12 determines that there are one or more queued commands in the command queue 14CQ that can be executed at this time, the microprocessor 12 is operative in step 218 to execute any queued commands in the command queue 14CQ that can be executed. Finally, in step 220 the microprocessor 12 is operative to transmit the status response word "0x91XX" to the terminal device 110. In this context, the status response word "0x91XX" indicates that the most recently sent command was successfully executed and that the smart card 10 has XX bytes of proactive command data (in the context of the present invention this means "results" of the type exemplarily illustrated in Table VI) to return. The terminal devise 110, in response to the receipt of the status response word "0x91XX" as a result of step 220, will transmit a FETCH command to the smart card 10, as discussed in the following paragraphs. In the case described in the current invention, the response to the FETCH command will be the results from executing one or more of the previously queued commands, i.e., the proactive RESULTS OF QUEUED COMMANDS command.

Figure 5:
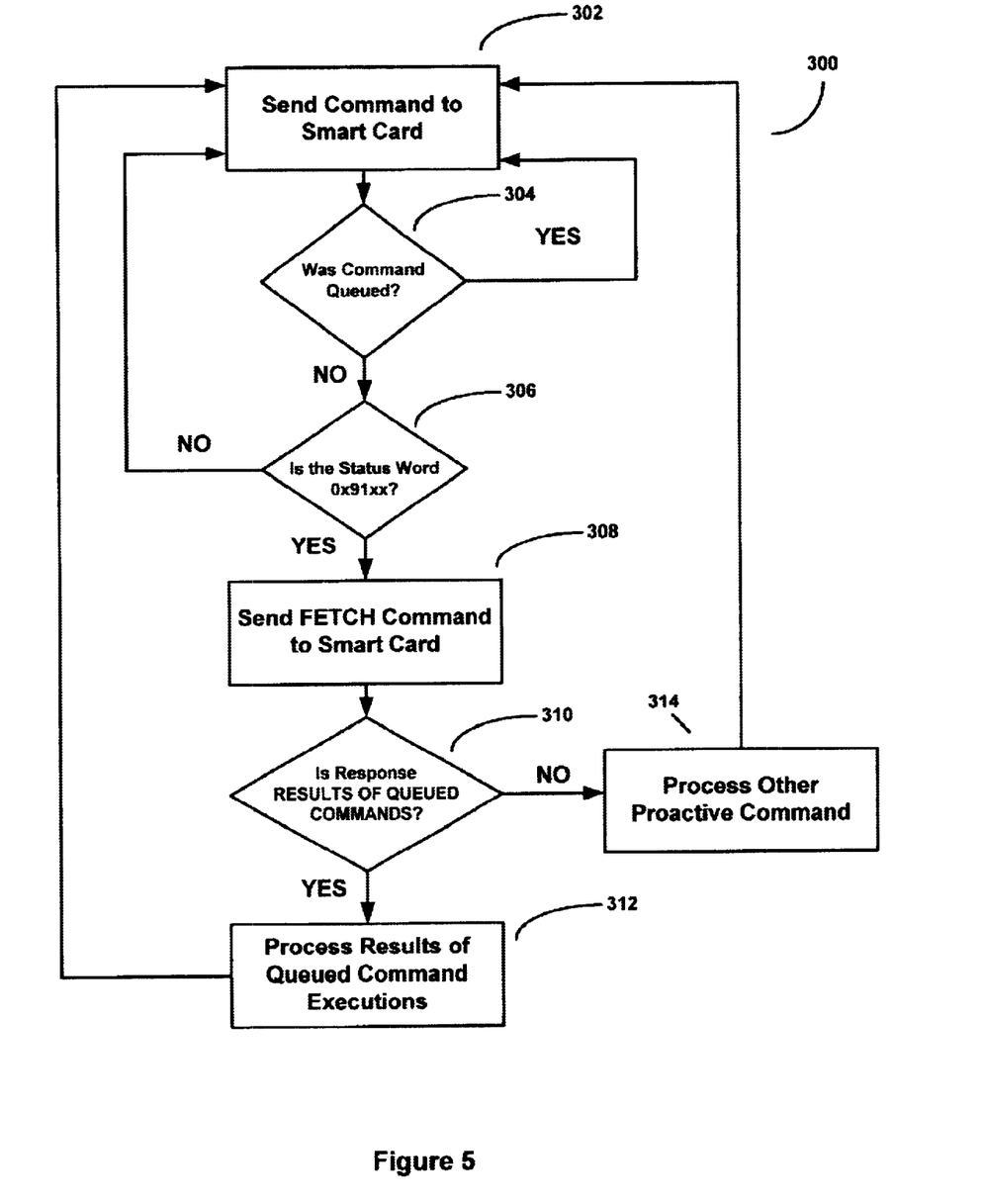
FIG. 5 is a flowchart of the method from the perspective of a terminal application interacting with a smart card implementing command queuing functionality and/or the proactive command functionality according to the present invention.

FIG. 5 illustrates the flowchart of an algorithm 300 from the standpoint of an application, e.g., application 114, 116, or 118, sending commands to the smart card 10 according to the present invention for processing. The algorithm 300 begins when the application sends a command to the smart card 10 in step 302.

Step 304 is an iterative step for continually determining whether any particular transmitted command has been placed in the command queue 14CQ of the smart card 10. If the status response word received from the smart card 10 is "0x91XX", as determined in step 306, the application sends a FETCH command to the smart card 10 in step 308 to retrieve the information produced by the smart card 10 that is associated with the processed command.

In Step 310 the algorithm determines whether a response received from the smart card is a RESULT OF QUEUED COMMANDS proactive command as described above. If a RESULT OF QUEUED COMMANDS proactive command is received by the application in step 310, the application is operative in step 312 to process any resultant data from such processed command. If the response received in step 310 is not a RESULT OF QUEUED COMMANDS proactive command, the application processes any other proactive commands received from the smart card 10 in step 314. If there no other proactive commands requiring processing, the algorithm 300 returns to step 302.

A variety of modifications and variations of the present invention are possible in light of the above teachings. It is therefore to be understood that, within the scope of the appended claims, the present invention may be practiced other than as specifically described herein.

What is claimed is:

1. A smart card having a command queuing functionality for operation in a multi-tasking environment wherein one or more independent applications initiate commands for processing by said smart card, comprising:
- a command queue for storing any command initiated by the independent applications that cannot be immediately processed by said smart card; and
- an instruction set for implementing said command queuing functionality of said smart card, said instruction set including
  - a first instruction for storing a command that cannot be immediately processed by said smart card in said command queue,
  - a second instruction for transmitting a command queuing status response word to the independent application that initiated the command that could not be immediately processed by said smart card, said command queuing status response word comprising
    - one or more first bytes that identify the command queuing status response word as a response associated with said command queuing capability of said smart card, and
    - one or more second bytes that identify a memory location in said command queue where the command that cannot be immediately processed by said smart card is stored, and
  - a third instruction for managing each queued command stored in said command queue.

2. The smart card of claim 1 wherein said command queuing status response word is 0x92YY such that said first bytes equal 92 and said second bytes equal YY where YY is a number that identifies said memory location in said command queue where the command that could not be immediately processed is stored.

3. The smart card of claim 1 wherein said command queuing status response word is 0x94YY such that said first bytes equal 94 and said second bytes equal YY where YY is a number that identifies said memory location in said command queue where the command that could not be immediately processed is stored.

4. The smart card of claim 1 wherein said third instruction for managing queued commands stored in said command queue further comprises:
- an instruction for maintaining the status of each queued command stored in said command queue;
- an instruction for monitoring the command currently being processed by said smart card; and
- an instruction for executing queued commands stored in said command queue when appropriate.

5. The smart card of claim 4 further comprising:
- an instruction set for implementing a proactive command identified as a RESULTS OF QUEUED COMMANDS to transmit the results of any queued commands that have been processed by said smart card, said instruction set including
  - an instruction for transmitting a status response word indicating that said smart card has processed one or more queued commands;
  - an instruction, operative in response to an external command, to prepare and transmit said proactive RESULTS OF QUEUED COMMANDS command containing the results of said one or more queued commands processed by said smart card.

6. The smart card of claim 5 wherein said external command is a FETCH command.

7. The smart card of claim 5 wherein said proactive RESULTS OF QUEUED COMMANDS command comprises:
- one or more bytes identifying the command details of said proactive RESULTS OF QUEUED COMMANDS command; and
- a series of bytes for each queued command processed by said smart card.

8. The smart card of claim 7 wherein said series of bytes for each queued command processed by said smart card comprises:
- one or more first bytes that identifies said memory location in said command queue of said queued command processed by said smart card;
- one or more second bytes defining a status response word for said queued command processed by said smart card;
- a third byte defining the length of data resulting from said queued command processed by said smart card; and
- one or more fourth bytes containing the data resulting from said queued command processed by said smart card.

9. A smart card having a command queuing functionality for operation in a multi-tasking environment wherein one or more independent applications initiate commands for processing by said smart card, comprising:
- a command queue for storing any command initiated by the independent applications that cannot be immediately processed by said smart card; and
- an instruction set for implementing said command queuing functionality of said smart card, said instruction set including
  - first instructions for storing a command that cannot be immediately processed by said smart card in said command queue, for transmitting a command queuing status response word to the independent application that initiated the command that could not be immediately processed by said smart card, for maintaining the status of each queued command stored in said command queue, for monitoring the command currently being processed by said smart card, and for executing queued commands stored in said command queue when appropriate, said command queuing status response word comprising
    - one or more bytes that identify said command queuing status response word as a response associated with the command queuing functionality of said smart card, and
    - one or more bytes that identify a memory location in said command queue where the command that cannot be immediately processed by said smart card is stored; and
  - second instructions for implementing a proactive command identified as a RESULTS OF QUEUED COMMANDS to transmit the results of any queued commands that have been processed by said smart card, said second instructions including an instruction for transmitting a status response word indicating that said smart card has processed one or more queued commands, and an instruction, operative in response to an external command, to prepare and transmit said proactive RESULTS OF QUEUED COMMANDS command containing the results of said one or more queued commands processed by said smart card.

10. The smart card of claim 9 wherein said proactive RESULTS OF QUEUED COMMANDS command comprises:
- one or more bytes identifying the command details of said proactive RESULTS OF QUEUED COMMANDS command; and a series of bytes for each queued command processed by said smart card.

11. The smart card of claim 10 wherein said series of bytes for each queued command processed by said smart card comprises:
one or more first bytes that identifies said memory location in said command queue of said queued command processed by said smart card;
one or more second bytes defining a status response word for said queued command processed by said smart card;
a third byte defining the length of data resulting from said queued command processed by said smart card; and
one or more fourth bytes containing the data resulting from said queued command processed by said smart card.

12. A smart card based information processing system having a command queuing functionality, comprising:
a smart card configured to receive and process commands;
a terminal device coupled to said smart card; and
one or more independent applications operative to generate and transmit commands to said smart card via said terminal device; and wherein said smart card includes
a command queue for storing any command initiated by the independent applications that cannot be immediately processed by said smart card; and
an instruction set for implementing said command queuing functionality, said instruction set including first instructions for storing a command that cannot be immediately processed by said smart card in said command queue, for transmitting a command queuing status response word to the independent application that initiated the command that could not be immediately processed by said smart card via said terminal device, for maintaining the status of each queued command stored in said command queue, for monitoring the command currently being processed by said smart card, and for executing queued commands stored in said command queue when appropriate, said command queuing status response word comprising
one or more bytes that identify said command queuing status response word as a response associated with the command queuing functionality of said smart card, and
one or more bytes that identify a memory location in said command queue where the command that cannot be immediately processed by said smart card is stored; and
second instructions for implementing a proactive command identified as a RESULTS OF QUEUED COMMANDS to transmit the results of any queued commands that have been processed by said smart card via said terminal device, said second instructions including an instruction for transmitting a status response word to said terminal device indicating that said smart card has processed one or more queued commands, and an instruction, operative in response to an external command transmitted via said terminal device, to prepare and transmit said proactive RESULTS OF QUEUED COMMANDS command containing the results of said one or more queued commands processed by said smart card to said terminal device.

13. The smart card of claim 12 wherein said proactive RESULTS OF QUEUED COMMANDS command comprises:
one or more bytes identifying the command details of said proactive RESULTS OF QUEUED COMMANDS command; and a series of bytes for each queued command processed by said smart card.

14. The smart card of claim 13 wherein said series of bytes for each queued command processed by said smart card comprises:
one or more first bytes that identifies said memory location in said command queue of said queued command processed by said smart card;
one or more second bytes defining a status response word for said queued command processed by said smart card;
a third byte defining the length of data resulting from said queued command processed by said smart card; and
one or more fourth bytes containing the data resulting from said queued command processed by said smart card.

15. A method for implementing command queuing in a smart card system operating in a multi-tasking environment wherein one or more independent applications initiate commands for processing by said smart card system, comprising the steps of:
providing a command queue in said smart card system;
storing in said command queue any command that cannot be immediately processed by said smart card system;
transmitting a command queuing status response word comprising one or more bytes that identify said command queuing status response word as a response associated with the command queuing functionality of said smart card and one or more bytes that identify a memory location in said command queue where the command that cannot be immediately processed by said smart card is stored to the independent application that initiated the command that could not be immediately processed by said smart card system; and
managing each queued command stored in said command queue.

16. The method of claim 15 wherein said managing step further comprises the steps of:
maintaining the status of each queued command stored in said command queue;
monitoring the command currently being processed by said smart card system; and
executing queued commands stored in said command queue when appropriate.

17. The method of claim 16 further comprising the steps of:
transmitting a status response word indicating that said smart card system has processed one or more queued commands;
formatting the results of the one or more processed queued commands as a proactive RESULTS OF QUEUED COMMANDS command; and
transmitting said RESULTS OF QUEUED COMMANDS.

18. A method for implementing command queuing in a smart card system operating in a multi-tasking environment wherein one or more independent applications initiate commands for processing by said smart card system, comprising the steps of:
providing a command queue in said smart card system;
storing in said command queue any command that cannot be immediately processed by said smart card system;
transmitting a command queuing status response word comprising one or more bytes that identify said com mand queuing status response word as a response associated with the command queuing functionality of said smart card and one or more bytes that identify a memory location in said command queue where the command that cannot be immediately processed by said smart card is stored to the independent application that initiated the command that could not be immediately processed by said smart card system;

maintaining the status of each queued command stored in said command queue;

monitoring the command currently being processed by said smart card system;

executing queued commands stored in said command queue when appropriate transmitting a status response word indicating that said smart card system has processed one or more queued commands;

formatting the results of the one or more processed queued commands as a proactive RESULTS OF QUEUED COMMANDS command; and transmitting said RESULTS OF QUEUED COMMANDS.

19. The method as in either claim 20 or 21 in which said proactive RESULTS OF QUEUED COMMANDS command comprises:

one or more first bytes identifying the command details of said proactive RESULTS OF QUEUED COMMANDS command; and a series of bytes for each queued command processed by said smart card system, said series of bytes including one or more first bytes that identifies said memory location in said command queue of said queued command processed by said smart card;

one or more second bytes defining a status response word for said queued command processed by said smart card;

a third byte defining the length of data resulting from said queued command processed by said smart card, and one or more fourth bytes containing the data resulting from said queued command processed by said smart card.

* * * * *